United States Patent
Kim

(10) Patent No.: US 11,556,914 B2
(45) Date of Patent: Jan. 17, 2023

(54) ELECTRONIC DEVICE AND METHOD FOR MAKING PAYMENT BY USING AUDIO MODULE

(71) Applicant: Samsung Electronics Co., Ltd., Suwon-si (KR)

(72) Inventor: Kibum Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 122 days.

(21) Appl. No.: 16/969,345

(22) PCT Filed: Mar. 5, 2019

(86) PCT No.: PCT/KR2019/002519
§ 371 (c)(1),
(2) Date: Aug. 12, 2020

(87) PCT Pub. No.: WO2019/172610
PCT Pub. Date: Sep. 12, 2019

(65) Prior Publication Data
US 2021/0049580 A1    Feb. 18, 2021

(30) Foreign Application Priority Data
Mar. 6, 2018    (KR) .................. 10-2018-0026171

(51) Int. Cl.
*G06Q 20/00* (2012.01)
*G06Q 20/32* (2012.01)
*G05B 15/02* (2006.01)
*G06F 3/16* (2006.01)
*G06Q 20/40* (2012.01)

(52) U.S. Cl.
CPC ......... *G06Q 20/3272* (2013.01); *G05B 15/02* (2013.01); *G06F 3/16* (2013.01); *G06Q 20/326* (2020.05); *G06Q 20/40* (2013.01)

(58) Field of Classification Search
CPC ...................................................... G06Q 20/40
(Continued)

(56) References Cited

U.S. PATENT DOCUMENTS 8,660,612 B2    2/2014  Zhu et al.
10,193,700 B2   1/2019  Liu et al.
(Continued)

FOREIGN PATENT DOCUMENTS

CN    105913246 A  *  8/2016  ....... G06K 19/06206
EP      3062271 A1  *  8/2016  ............. G06F 3/041
(Continued)

OTHER PUBLICATIONS

Eavesdropping of Magnetic Secure Transmission Signals and Its Security Implications for a Mobile Payment Protocol IEEE Daeseon Choi et al vol. 6 p. 42687-42701. (Year: 2018).*
(Continued)

*Primary Examiner* — Bruce I Ebersman
*Assistant Examiner* — John A Anderson
(74) *Attorney, Agent, or Firm* — Jefferson IP Law, LLP

(57) ABSTRACT

According to various embodiment of the present invention, an electronic device comprises: an audio module including a speaker and a receiver; a codec circuit for transmitting and receiving an audio signal; a magnetic secure transmission (MST) circuit; a switch unit; a memory; and a processor electrically connected with the audio module, the codec circuit, the MST circuit, the switch unit, and the memory, wherein, if a function for requesting a payment is executed when the codec circuit and the audio module are connected with each other, the processor can be configured to: control the switch unit so as to connect the MST circuit with the speaker and/or the receiver, which are included in the audio module; and transmit the MST signal for the payment by using the speaker and/or the receiver, which are connected
(Continued)

with the MST circuit. In addition to various embodiments disclosed in the present invention, other various embodiments are possible.

8 Claims, 10 Drawing Sheets

(58) Field of Classification Search
USPC .......................................................... 705/44
See application file for complete search history.

(56) References Cited

U.S. PATENT DOCUMENTS

| | | |
|---|---|---|
| 2016/0247057 A1 | 8/2016 | Lee et al. |
| 2016/0364715 A1 | 12/2016 | Cho et al. |

FOREIGN PATENT DOCUMENTS

| | | | | |
|---|---|---|---|---|
| KR | 10-2016-0023750 A | | 3/2016 | |
| KR | 10-2016-0065260 A | | 6/2016 | |
| KR | 10-2016-0099464 A | | 8/2016 | |
| KR | 20160023750 A | * | 8/2016 | ............. G06K 20/40 |
| KR | 20160099464 | * | 8/2016 | ............. G06Q 20/40 |
| KR | 10-2016-0103354 A | | 9/2016 | |
| KR | 10-1679271 B1 | | 11/2016 | |
| KR | 10-1691557 B1 | | 12/2016 | |

OTHER PUBLICATIONS

Designing an Audio Channel for Low-bandwidth Mobile Optical Networks Samer Shammaa*, Robert Huck, Pramode Verma (Year: 2009).*

* cited by examiner

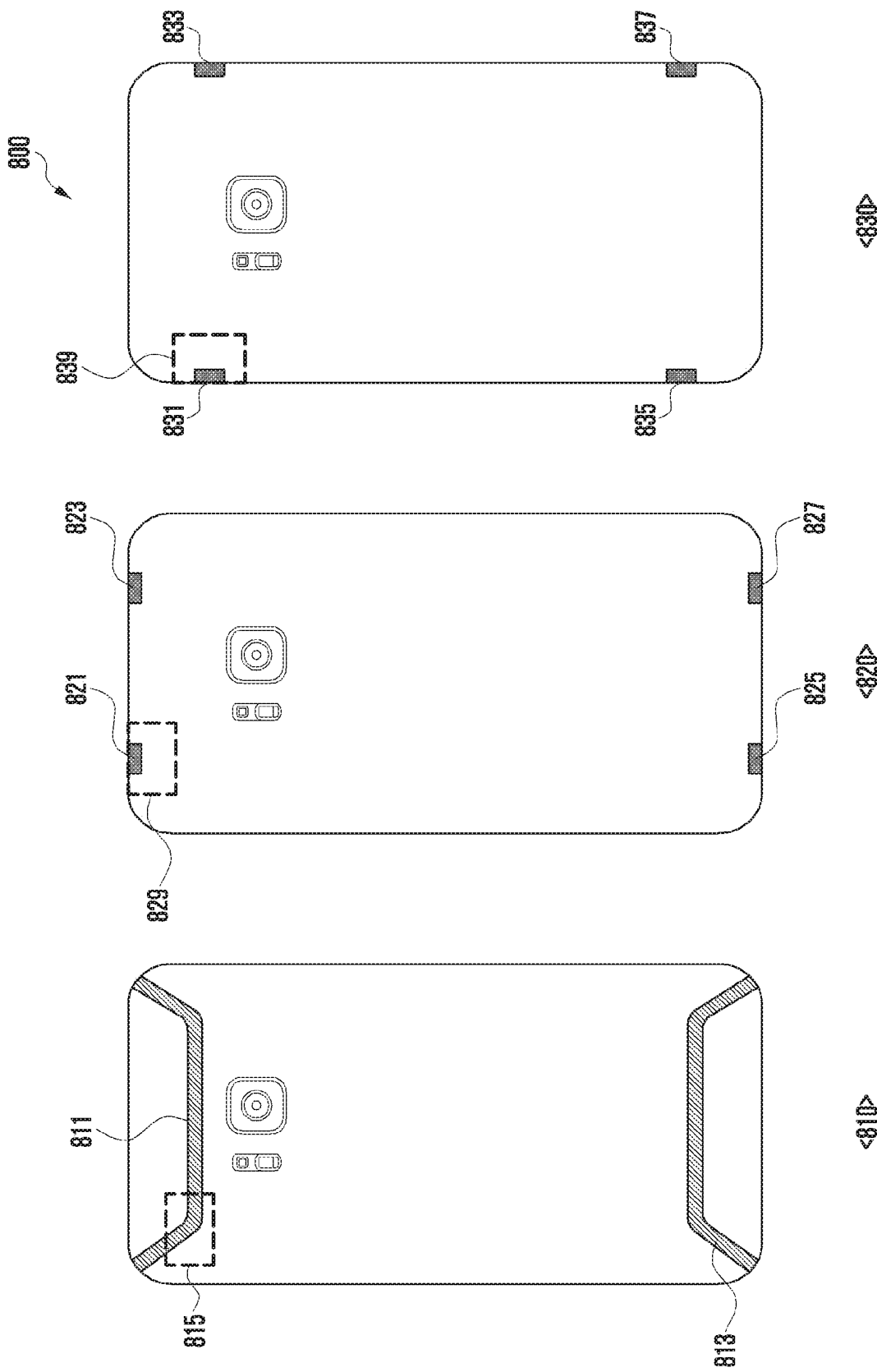

ELECTRONIC DEVICE AND METHOD FOR MAKING PAYMENT BY USING AUDIO MODULE

TECHNICAL FIELD

Various embodiments of the disclosure relate to an electronic device and a method for making a payment by using an audio module.

BACKGROUND ART

Widespread use of various electronic devices such as smartphones, tablet PCs, laptop PCs (personal computers), and wearable devices has been followed by an increasing interest in technologies for making simple payments by using various electronic devices. Various kinds of simple payment technologies have been developed as a result of an increasing interest in simple payments.

Among various simple payment technologies, a magnetic secure transmission (MST) payment scheme refers to a technology for transmitting information regarding a card to be used for a payment by bringing an electronic device including a flexible PCB (FPCB) (for example, coil) and a loop antenna implemented as a magnetic sheet having a permeability close to a payment terminal (for example, points of sales (POS)). For example, an electronic device may deliver card information to a payment terminal by using a loop antenna to produce the same magnetic field as that produced when a payment card (for example, credit card, debit card, or check card), which is a conventional payment means, is swiped through the payment terminal. The payment terminal may recognize the magnetic field that has been output, thereby making a simple payment. The magnetic sheet may play the role of increasing the card information transmission efficiency by improving the antenna characteristics (for example, magnetic field beam forming).

DISCLOSURE OF INVENTION

Technical Problem

However, use of the magnetic sheet may increase the material cost and thicken the electronic device. In addition, if the electronic device has a metal rear structure, magnetic field signals produced through the loop antenna can be radiated only through a nonmetal segmented portion provided on the electronic device, and this may increase the degree of difficulty of the antenna design.

An electronic device according to various embodiments of the disclosure may enable MST communication, if a function that requests a payment is executed, by using at least one of a speaker and a receiver included in an audio module thereof.

Solution to Problem

According to various embodiments of the disclosure, an electronic device may include: an audio module including a speaker and a receiver; a codec circuit configured to transmit/receive an audio signal; a magnetic secure transmission (MST) circuit; a switch unit; a memory; and a processor electrically connected to the audio module, the codec circuit, the MST circuit, the switch unit, and the memory. The processor may: control the switch unit such that the MST circuit is connected to at least one of the speaker and the receiver included in the audio module if a function that requests a payment is executed in a state in which the codec circuit and the audio module are connected; and emit an MST signal for a payment by using at least one of the speaker and the receiver, which is connected to the MST circuit.

According to various embodiments of the disclosure, an electronic device may include: an audio module including at least one coil; a codec circuit configured to transmit/receive an audio signal; a magnetic secure transmission (MST) circuit; a switch unit; and a processor electrically connected to the audio module, the codec circuit, the MST circuit, and the switch unit. The processor may: control the switch unit such that the MST circuit and the at least one coil are connected if a function that requests a payment is executed in a state in which the codec circuit and the audio module are connected; and emit an MST signal for a payment by using the at least one coil connected to the MST circuit.

According to various embodiments of the disclosure, a method for making a payment by using an audio module may include the operations of: executing a function that requests a payment in a state in which a codec circuit and the audio module are connected; connecting an MST circuit and at least one of a speaker and a receiver included in the audio module, if the function that requests a payment is executed; and emitting an MST signal for a payment by using at least one of the speaker and the receiver, which is connected to the MST circuit.

Advantageous Effects of Invention

An electronic device according to various embodiments of the disclosure may perform MST communication by using at least one of a speaker and a receiver included in an audio module, without including a separate MST antenna. This may not only reduce the material cost and thickness of the electronic device, but also decrease design-related restrictions.

BRIEF DESCRIPTION OF DRAWINGS

FIG. 8A and FIG. 8B are diagrams illustrating at least one segmented portion and a speaker disposed on the exterior of an electronic device according to various embodiments.

MODE FOR THE INVENTION

Figure 1:
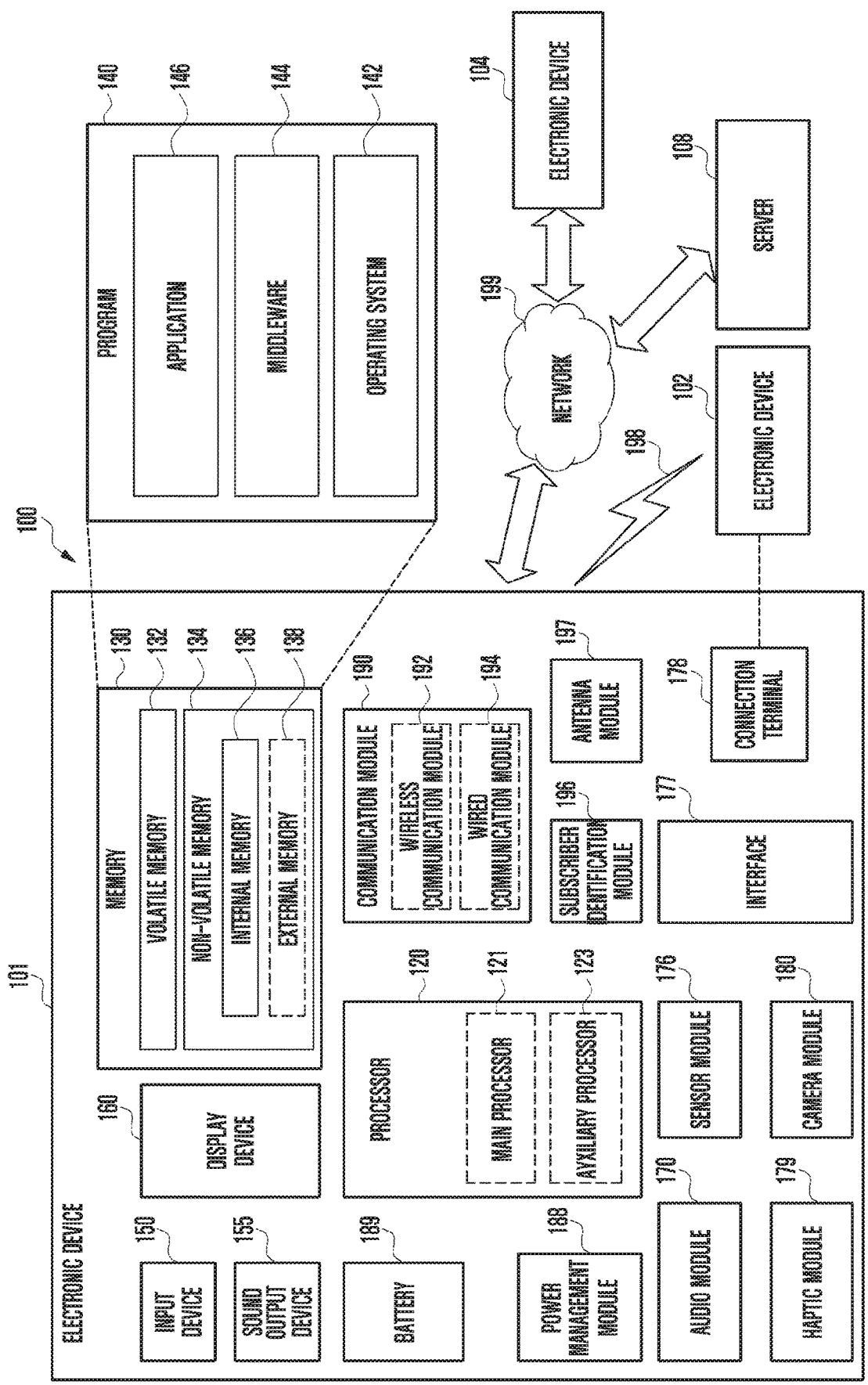
FIG. 1 is a block diagram of an electronic device for making a payment through an audio module inside a network environment according to various embodiments.

FIG. 1 is a block diagram of an electronic device in a network environment, according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) (e.g., speaker or headphone) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) (e.g., a wireless transceiver) or a wired communication module 194 (e.g., a local area network (LAN) communication module or a power line communication (PLC) module) (e.g., a wired transceiver). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
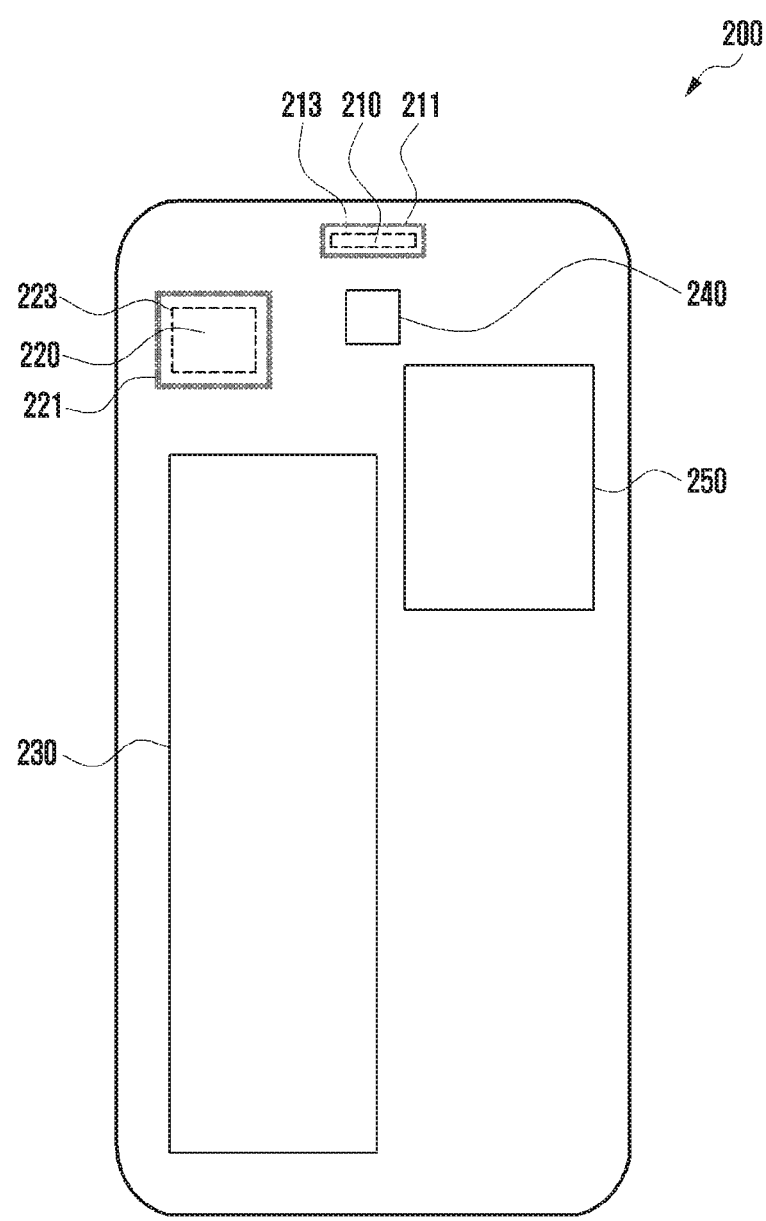
FIG. 2 is a diagram schematically illustrating an electronic device according to various embodiments.

FIG. 2 is a diagram 200 schematically illustrating an electronic device according to various embodiments.

Referring to FIG. 2, the electronic device (for example, electronic device 101 in FIG. 1) may include a receiver 210, a speaker 220, a battery 230 (for example, battery 189 in FIG. 1), a camera 240 (for example, camera module 180 in FIG. 1), and a magnetic secure transmission (MST) circuit 250 therein.

In an embodiment, the receiver 210 and the speaker 220 may include metal portions 211 and 221 and coils 213 and 223, respectively. For example, the metal portions 211 and 221 may include copper, silver, aluminum, or the like.

In an embodiment, the receiver 210 and the speaker 220 may output an audio signal. For example, the receiver 210 may be used to output an audio signal received through a telephone speech. The speaker 220 may output an audio signal transmitted/received during a telephone speech (for example, outgoing sound or incoming sound), an audio signal included in a received message, an audio signal resulting from playback of an audio file stored in a memory, or the like.

In an embodiment, if a function that requests a payment is executed, at least one of the receiver 210 and the speaker 220 may be connected to the MST circuit 250 and may operate as a module for making a payment, instead of functioning as a module for performing an audio output function. For example, if a function that requests a payment is executed, the coils 213 and 223 that constitute the receiver 210 and the speaker 220, respectively, may operate as antennas that form magnetic field signals (for example, MST signals) for a magnetic payment. In addition, if a function that requests a payment is executed, the metal portions 211 and 221 that constitute the receiver 210 and the speaker 220, respectively, may radiate the formed magnetic field signals (for example, MST signals) as antenna radiators.

In an embodiment, the material of the area in which the coils 213 and 223 are disposed may have different characteristics from the material of the area in which the coils 213 and 223 are not disposed. For example, the area in which the coils 213 and 223 are disposed may include a nonconductive material (for example, plastic), and the area in which the coils 213 and 223 are not disposed may include a conductive material (for example, metal portions 211 and 221). Radiation of magnetic signals formed by the coils (for example, MST signals) through the conductive material may increase the radiation efficiency of the MST signals.

In an embodiment, the electronic device may include at least one segmented portion. For example, if the exterior of the electronic device is made of a conductive member (for example, metal), the at least one included segmented portion may prevent degradation of the quality of the MST signals caused by interference occurring when the MST signals are transmitted.

Segmented portions according to various embodiments will be described later with reference to FIG. 8A and FIG. 8B.

In an embodiment, the receiver 210 and the speaker 220 may be disposed to at least partially overlap at least one segmented portion provided on the electronic device.

In an embodiment, if the speaker 220 among the receiver 210 and the speaker 220 is connected to the MST circuit 250 in response to execution of a function that requests a payment, MST signals may be radiated through the segmented portion disposed to overlap the speaker 220, thereby preventing degradation of the quality of the MST signals.

In an embodiment, if the exterior of the electronic device is made of a nonconductive (for example, nonmetal) material or is injection-molded, the receiver 210 and the speaker 220 may be disposed in at least a partial area of the exterior which is made of the nonconductive material, or which is injection-molded.

In an embodiment, if the exterior of the electronic device includes a conductive (for example, metal) part and a nonconductive part, the receiver 210 and the speaker 220 may be disposed in at least a partial area of the nonconductive part.

Figure 3:
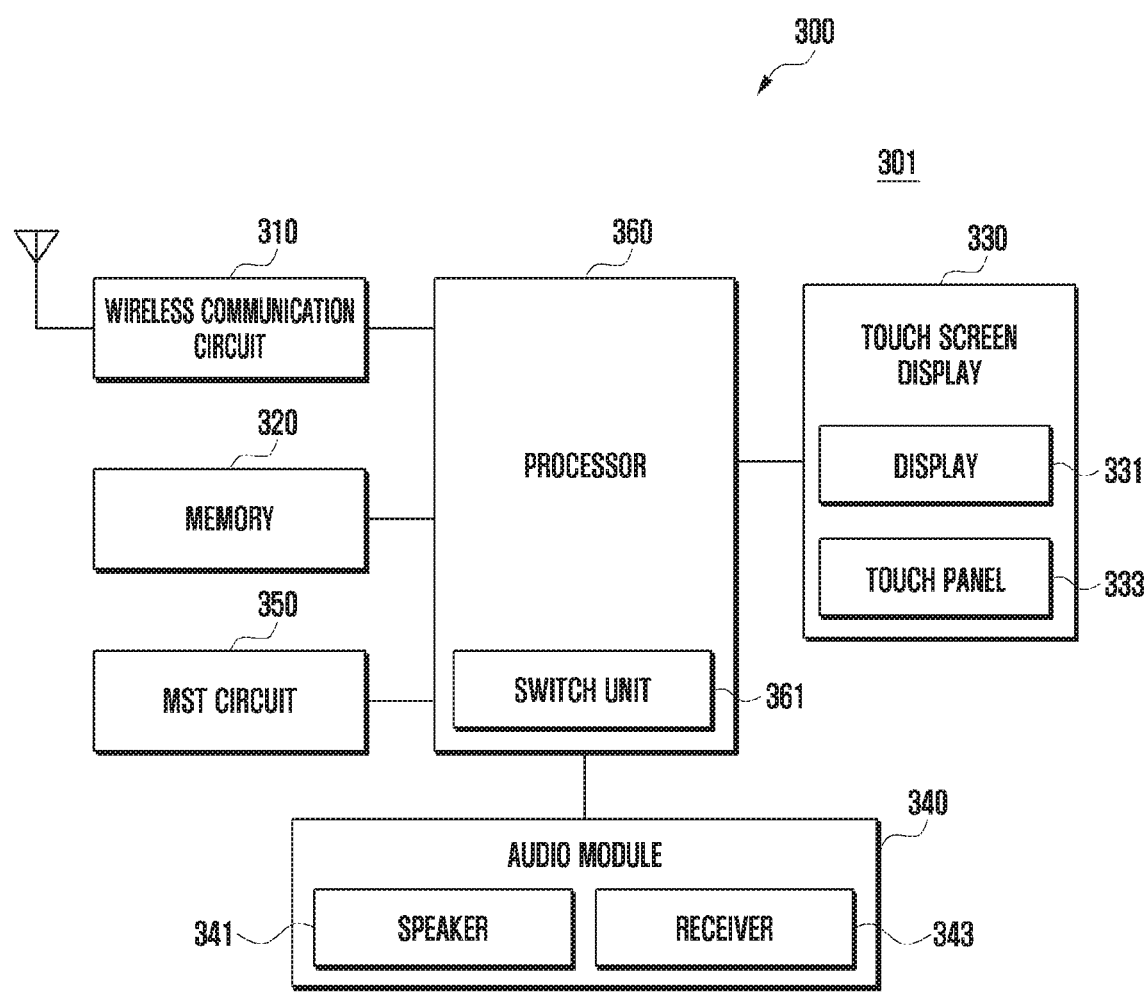
FIG. 3 is a block diagram illustrating an electronic device according to various embodiments.

FIG. 3 is a block diagram 300 illustrating an electronic device according to various embodiments.

Referring to FIG. 3, the electronic device 301 (for example, electronic device 101 in FIG. 1) may include a wireless communication circuit 310 (for example, communication module 190 in FIG. 1), a memory 320 (for example, memory 130 in FIG. 1), a touch screen display 330 (for example, display device 160 in FIG. 1), an audio module 340 (for example, audio module 170 in FIG. 1), a magnetic secure transmission (MST) circuit 350 (for example, MST circuit 250 in FIG. 2), and a processor 360 (for example, processor 120 in FIG. 1).

According to various embodiments of the disclosure, the wireless communication circuit 310 may connect communication between the electronic device 301 and an external electronic device (for example, electronic device 102, electronic device 104, or server 108 in FIG. 1).

According to various embodiments of the disclosure, the memory 320 may include a program memory configured to store operation programs of the electronic device 301 and a data memory configured to store data such as log information, contents, and objects, which occur during program execution.

In an embodiment, the memory 320 may store a user interface associated with a payment function. The memory 320 may store information regarding at least one card, which is necessary for payments.

In an embodiment, the memory 320 may store a switch control program for controlling a switch unit 361. The memory 320 may store a predefined condition for switching the connection between a codec circuit and the MST circuit 350 and the audio module 340 by controlling the switch unit 361.

According to various embodiments of the disclosure, the touch screen display 330 may be configured integrally so as to include a display portion 331 and a touch panel 333.

In an embodiment, the touch screen display 330 may display a payment-related user interface under the control of the processor 360. The payment-related user interface may include a user interface related to card registration, payments, or transactions. For example, the touch screen display 330 may display a user interface related to card registration through a reader (for example, optical character reader/recognition (OCR)) or external input (for example, user input) under the control of the processor 360. In addition, the touch screen display 330 may display a user interface related to user authentication through identification and verification (ID&V) under the control of the processor 360. In addition, the touch screen display 330 may display a user interface related to payment completion under the control of the processor 360.

According to various embodiments of the disclosure, the audio module 240 may include a speaker 341 (for example, speaker 220 in FIG. 2) and a receiver 343 (for example, receiver 210 in FIG. 2). Although not illustrated, the audio module 340 may further include an earphone and a microphone. The audio module 340 may process audio signals that are input or output through the speaker 341, the receiver 343, the earphone, or the microphone.

In an embodiment, each of the speaker 341 and the receiver 343 may be made of a coil (for example, coils 213 and 223 in FIG. 2) and a metal portion (for example, metal portions 211 and 221 in FIG. 2).

In an embodiment, if a function that requests payment is executed, the coil of at least one of the speaker 341 and the receiver 343 may operate as an antenna that forms a magnetic signal (for example, MST signal) for a magnetic payment, under the control of the processor 360. For example, the coil may produce a pulse according to transmission data by using an electromagnetic signal, and the pulse may generate a magnetic field signal.

In an embodiment, if a function that requests payment is executed, the metal portion of at least one of the speaker 341 and the receiver 343 may operate as an antenna radiator that emits the magnetic signal (for example, MST signal) formed by the coil, under the control of the processor 360.

According to various embodiments of the disclosure, the MST circuit 350 may receive, from the processor 360, a signal that instructs the same to output data including payment information and an MST signal including the data through at least one of the speaker 341 and the receiver 343, and may control at least one of the speaker 341 and the receiver 343 based on the received command signal.

According to various embodiments of the disclosure, the processor 360 may control operations of overall operations of the electronic device 301 and the flow of signals between internal components of the electronic device 301, may perform data processing, and may control supply of power from the battery (for example, battery 230 in FIG. 2) to the components.

According to an embodiment, the processor 360 may include a switch unit 361.

In an embodiment, if a function that requests a payment is executed in a state in which the codec circuit (not illustrated) and the audio module 340 are connected, the processor 360 may control the switch unit 361 so as to connect the MST circuit 350 and at least one of the speaker 341 and the receiver 343 included in the audio module 340.

In an embodiment, if a function that requests a payment is executed, the processor 360 may further perform an operation of determining whether or not an audio signal is currently output through the audio module 340. For example, whether or not the audio signal is currently output may include whether or not a telephone speech function is performed through the receiver 343, whether or not an audio signal is output through the audio module 341, and the like.

In an embodiment, the processor 360 may control, based on whether or not an audio signal is output, the switch unit 361 so as to connect the MST circuit 350 and at least one of the speaker 341 and the receiver 343 included in the audio module 340 according to a predefined condition. For example, the predefined condition may include at least one of: whether or not the audio module 340, for example, the speaker 341 is currently used; and/or whether or not the receiver 343 is currently used; and a predetermined priority.

In an embodiment, the processor 360 may emit an MST signal by using at least one of the speaker 341 and the receiver 343, which is connected to the MST circuit 350, and may perform a payment function. For example, each of the speaker 341 and the receiver 343 may include a coil and a metal portion, and may emit (for example, radiate) a magnetic field signal (for example, MST signal) formed through the coil through the metal portion.

In an embodiment, after the MST signal is emitted, if a payment completion message is received, or if a signal that stops production of the MST signal is received, the processor 360 may control the switch unit 361 such that at least one of the speaker 341 and the receiver 343, which is connected to the MST circuit 350, is connected to the codec circuit. For example, the signal that stops production of the MST signal may include at least one of a signal that senses that a predetermined time passes after the MST signal is emitted, a signal that senses that the electronic device is on the move, and a user input for ending the payment function.

In an embodiment, the electronic device 301 may include an audio module 340 including a speaker 341 and a receiver 343; a codec circuit configured to transmit/receive audio signals; a magnetic secure transmission (MST) circuit 350; a switch unit 361; a memory 320; and a processor 360 electrically connected to the audio module 340, the codec circuit, the MST circuit 350, the switch unit 361, and the memory 320. If a function that requests a payment is received in a state in which the codec circuit and the audio module 340 are connected, the processor 360 may control the switch unit 361 so as to connect the MST circuit 350 and at least one of the speaker 341 and the receiver 343 included in the audio module 340, and may emit an MST signal for a payment by using at least one of the speaker 341 and the receiver 343, which is connected to the MST circuit 350.

In an embodiment, each of the speaker 341 and the receiver 343 may include a coil and a metal portion.

In an embodiment, the processor 360 may produce the MST signal through the coil of at least one of the speaker 341 and the receiver 343, which is connected to the MST circuit 350, and may emit the produced MST signal through the metal portion.

In an embodiment, if a function that requests a payment is executed, the processor 360 may determine whether or not an audio signal is currently output through at least one of the speaker 341 and the receiver 343, and may control the switch unit 361 such that the MST circuit 350 is connected to at least one of the speaker 341 and the receiver 343 included in the audio module 340 according to a predefined condition, based on whether or not the audio signal is output.

In an embodiment, the predefined condition may include at least one of: whether or not at least one of the speaker 341 and the receiver 343 is used; and a predefined priority.

In an embodiment, if a payment completion message is received after an MST signal for a payment is emitted, the processor 360 may control the switch unit 361 such that at least one of the speaker 341 and the receiver 343, which is connected to the MST circuit 350, is connected to the codec circuit.

In an embodiment, after an MST signal for a payment is emitted, if a signal that stops production of the MST signal is received, the processor 360 may control the switch unit 361 such that at least one of the speaker 341 and the receiver 343, which is connected to the MST circuit 350, is connected to the codec circuit.

In an embodiment, the signal that stops production of the MST signal may include at least one of a signal that senses that a predetermined time passes after the MST signal for a payment is emitted, a signal that senses that the electronic device 301 is on the move, and a user input for ending the payment function.

In an embodiment, the exterior of the electronic device 301 may be made of a conductive member (for example, metal), and the exterior of the electronic device 301, made of the conductive member, may include at least one segmented portion.

In an embodiment, the speaker 341 and the receiver 343 may be disposed to at least partially overlap the at least one segmented portion.

In an embodiment, if the exterior of the electronic device 301 is injection-molded or is made of a nonconductive (for example, nonmetal) member, the speaker 341 and the receiver 343 may be disposed in at least a part of the area which is injection-molded or made of the nonconductive member. If the exterior of the electronic device 301 includes a conductive part and a nonconductive part, the speaker 341 and the receiver 343 may be disposed in at least a part of the nonconductive part.

In an embodiment, the electronic device 301 may include an audio module 340 (for example, speaker 341 or receiver 343) including at least one coil; a codec circuit configured to transmit/receive audio signals; a magnetic secure transmission (MST) circuit 350; a switch unit 361; and a processor 360 electrically connected to the audio module 340, the codec circuit, the MST circuit 350, and the switch unit 361. If a function that requests a payment is received in a state in which the codec circuit and the audio module 340 are connected, the processor 360 may control the switch unit 361 so as to connect the MST circuit 350 and the at least one coil, and may emit an MST signal for a payment by using the at least one coil connected to the MST circuit 350.

In an embodiment, the exterior of the electronic device 301 may be made of a conductive member, the exterior of the electronic device 301, made of the conductive member, may include at least one segmented portion, and the at least one coil may be disposed to at least partially overlap the at least one segmented portion.

In an embodiment, if the exterior of the electronic device 301 is made of a nonconductive member, the at least one coil may be disposed in at least a part of an area made of the nonconductive member.

In an embodiment, if the exterior of the electronic device 301 includes a conductive part and a nonconductive part, the at least one coil may be disposed on at least a part of the nonconductive part.

Figure 4:
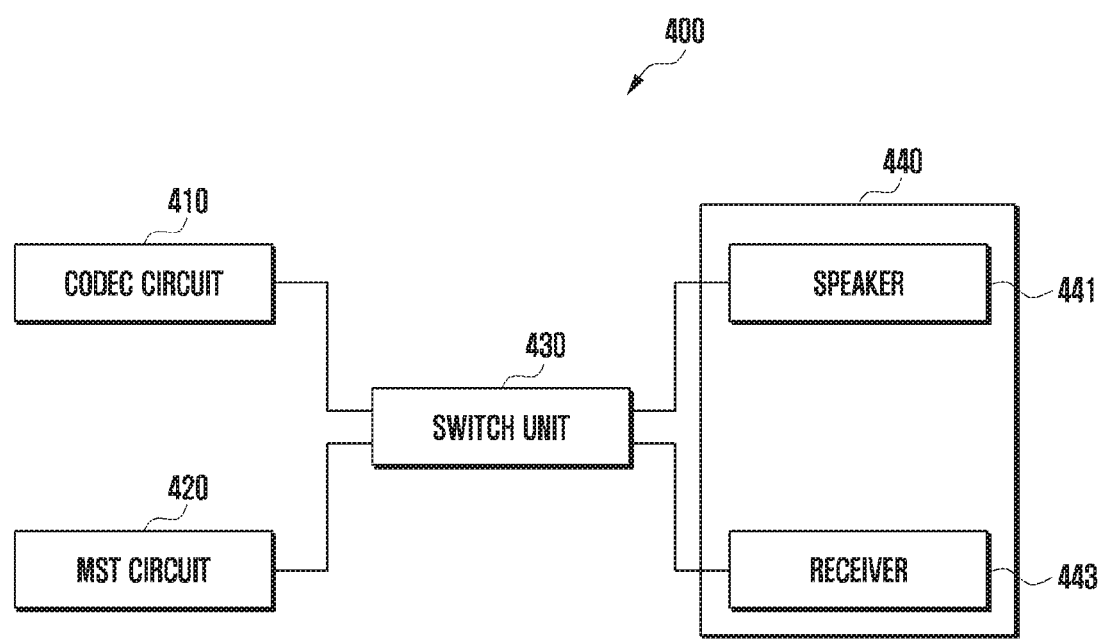
FIG. 4 is a block diagram for describing a method for switching the connection between a codec circuit or an MST circuit and an audio module according to various embodiments.

FIG. 4 is a block diagram 400 for describing a method for switching the connection between a codec circuit and/or an MST circuit and an audio module, according to various embodiments.

Referring to FIG. 4, a codec circuit 410 and an audio module 440 (for example, audio module 340 in FIG. 3) may be connected. A processor (for example, processor 360 in FIG. 3) may transmit an audio signal to the audio module 440 via the codec circuit 410.

In an embodiment, except for an operation of performing a payment-related function, the codec circuit 410 and the audio module 440 may remain connected.

In an embodiment, if a function that requests a payment is received in a state in which the codec circuit 410 and the audio module 440 are connected, the processor may control a switch unit 430 (for example, switch unit 361 in FIG. 3) so as to connect an MST circuit 420 (for example, MST circuit 350 in FIG. 3) and at least one of a speaker 441 (for example, speaker 341 in FIG. 3) and a receiver 443 (for example, receiver 343 in FIG. 3) included in the audio module 440.

In an embodiment, if a function that requests a payment is executed, the processor may determine whether or not an audio signal is currently output through the audio module 440. For example, whether or not the audio signal is currently output may include whether or not a telephone speech function is performed through the receiver 443, whether or not an audio signal is output through the speaker 441, and the like.

In an embodiment, based on whether or not an audio signal is output, the processor may control the switch unit 430 such that the MST circuit 420 and at least one of the speaker 441 and the receiver 443, included in the audio module 440, are connected according to a predefined condition.

In an embodiment, the predefined condition may include at least one of: whether or not the audio module 440, for example, the speaker 441 is currently used; and/or whether or not the receiver 443 is currently used; and a predetermined priority.

In an embodiment, if it is determined that no audio signal is output through the receiver 443 and the speaker 441, the processor may control the switch unit 430 so as to connect the MST circuit 420 and at least one of the receiver 443 and the speaker 441.

In an embodiment, if it is determined that no audio signal is output through the receiver 443 and the speaker 441, the processor may control the switch unit 430 so as to connect the MST circuit 420 and a module having a predefined priority, for example, a module configured to have a high priority among the receiver 443 and the speaker 441.

In an embodiment, if a function that requests a payment is received while a telephone speech function is performed through the speaker 441, the processor may control the switch unit 430 so as to connect the codec circuit 410 and the receiver 443, and may control the switch unit 430 so as to connect the MST circuit 420 and the speaker 441. As a result, the receiver 443 may operate for the telephone speech function, and the speaker 441 may operate for the payment function.

In an embodiment, if a function that requests a payment is received while an audio signal of music or image is output through the speaker 441, the processor may control the switch unit 430 so as to connect the MST circuit 420 and the receiver 443. As a result, the speaker 441 may operate for the speaker function, and the receiver 443 may operate for the payment function.

In an embodiment, if a function that requests a payment is received while an audio signal of music or image is output through the speaker 441, the processor may control the switch unit 430 so as to disconnect the codec circuit 410 and the speaker 441 from each other and to connect the MST circuit 420 and the speaker 441. As a result, the speaker 441 may operate as a module for performing the payment function, instead of outputting audio signals.

In an embodiment, the processor may emit an MST signal for performing a payment function by using at least one of the speaker 441 and the receiver 443, which is connected to the MST circuit 420.

In an embodiment, each of the speaker 441 and the receiver 443 may include a coil (for example, coils 213 and 223 in FIG. 2) and a metal portion (for example, metal portions 211 and 221 in FIG. 2).

In an embodiment, the processor may form a magnetic field signal (for example, MST signal) for a payment through the coil at least one of the speaker 441 and the receiver 443, which is connected to the MST circuit 420, and may emit the magnetic field signal through the metal portion.

In an embodiment, if a telephone call is received while an MST signal is emitted through the audio module 440 (for example, speaker 441) in a state in which a bell sound mode is configured, the processor may control the switch unit 430 such that the MST module 420 and the audio module 440 remain connected to each other. For example, the processor may switch the bell sound mode to a vibration mode and may output vibrations instead of outputting bell sounds to indicate the incoming call, or may display a popup window through a display (for example, display 331 in FIG. 3). As a result, the operation of performing the payment function through the speaker 441 may be performed seamlessly.

In an embodiment, after the MST signal is emitted, if a payment completion message is received, or if a signal that stops production of the MST signal is received, the processor may control the switch unit 430 such that at least one of the speaker 441 and the receiver 443, which is connected to the MST circuit 420, is connected to the codec circuit 410. For example, the signal that stops production of the MST signal may include at least one of a signal that senses that a predetermined time passes after the MST signal is emitted, a signal that senses that the electronic device is on the move, and a user input for ending the payment function.

In an embodiment, if a function that requests a payment is received in a state in which the codec circuit 410 and the audio module 440 are connected, the processor may control the switch unit 430 so as to connect the MST circuit 420 and at least one coil included in the audio module 440, and may emit an MST signal for a payment by using the at least one coil.

Figure 5:
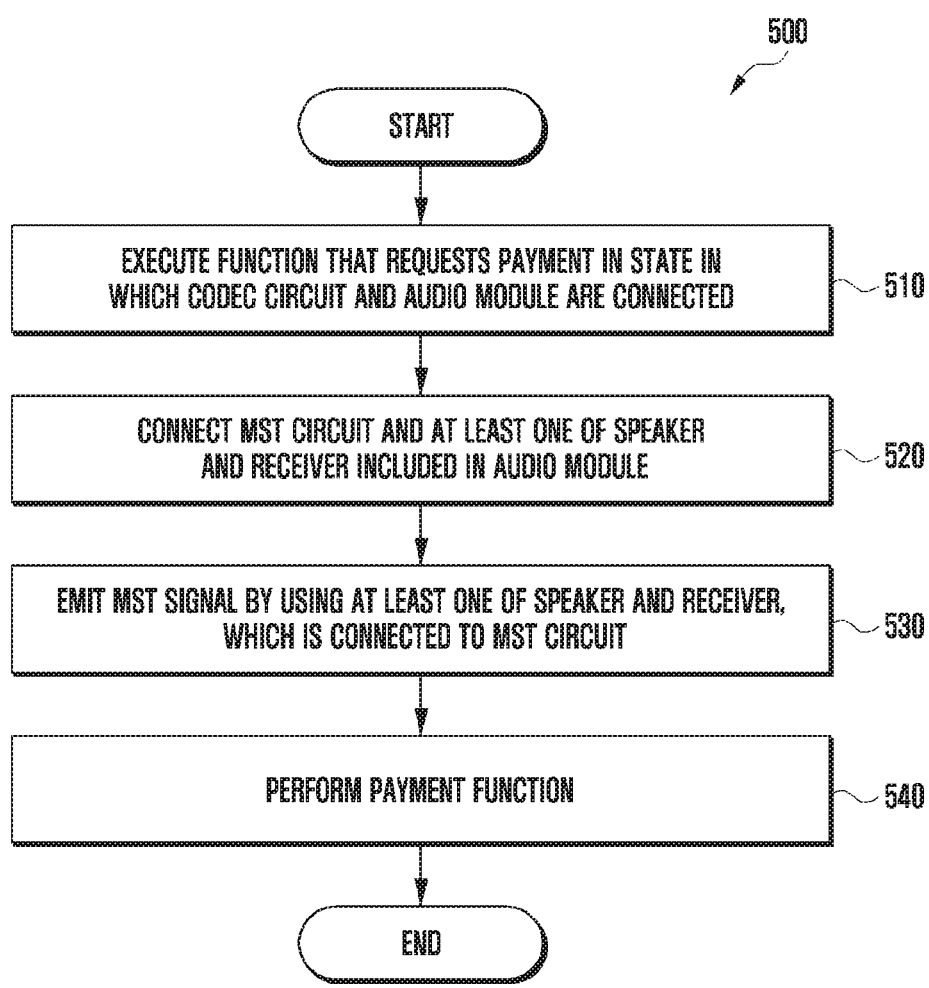
FIG. 5 is a flowchart for describing a method for making a payment by an electronic device according to various embodiments.

FIG. 5 is a flowchart 500 for describing a method for making a payment by an electronic device according to various embodiments.

Referring to FIG. 5, a processor (for example, processor 360 in FIG. 2) may perform a function that requests a payment in a state in which a codec circuit (for example, codec circuit 410 in FIG. 4) and an audio module (for example, audio module 440 in FIG. 4) are connected, in operation 510.

For example, if a user input that requests a payment is received, or if an NFC signal is sensed when an electronic device (for example, electronic device 301 in FIG. 3) approaches an external device (for example, POS) after security authentication for a payment is completed, the processor may determine that the function that requests a payment has been executed. However, this is not limiting in any manner.

In an embodiment, if a function that requests a payment is executed, the processor may control a switch unit (for example, switch unit 430 in FIG. 3) so as to connect an MST circuit (for example, MST circuit 420 in FIG. 4) and at least one of a speaker (for example, speaker 441 in FIG. 4) and a receiver (for example, receiver 443 in FIG. 4) included in the audio module, in operation 520.

In an embodiment, the processor may emit an MST signal by using at least one of the speaker and the receiver, which is connected to the MST circuit, in operation 530, and may perform a payment function in operation 540.

In an embodiment, each of the speaker and the receiver may include a coil (for example, coils 213 and 223 in FIG. 2) and a metal portion (for example, metal portions 211 and 221 in FIG. 2). The coil may operate as an antenna for a magnetic payment, and may form a magnetic field signal (for example, MST signal). The metal portion may operate as an antenna radiator, and may radiate (for example, emit) the formed magnetic field signal.

In an embodiment, the processor may receive an input that requests execution of a payment application before the function that requests a payment is executed. The processor may execute the payment application in response to an input that requests execution of the payment application. If the payment application is executed, the processor may display an image corresponding to at least one piece of card information to be used when making a payment. The at least one piece of card information may be pre-registered in a memory (for example, memory 320 in FIG. 3) through card registration. The processor may emit an MST signal corresponding to card information selected from the displayed image.

In an embodiment, if a payment completion message is received after the MST signal is emitted, the processor may control the switch unit such that at least one of the speaker and the receiver, which is connected to the MST circuit, is connected to the codec circuit.

In an embodiment, if a signal that stops production of the MST signal is received, the processor may stop emission of the MST signal. For example, the signal that stops production of the MST signal may include at least one of a signal that senses that a predetermined time passes after the MST signal is emitted, a signal that senses that the electronic device is on the move, and a user input for ending the payment function.

In an embodiment, if a signal that stops production of the MST signal is received, the processor may control the switch unit such that at least one of the speaker and the receiver, which is connected to the MST circuit, is connected to the codec circuit.

In an embodiment, an operation of registering card information to be used for the payment function, a method for authenticating security for a payment, and a method for performing a payment function based on card information selected from the registered card information are widely known technologies and would be obvious to a person skilled in the technical field of the disclosure, and detailed descriptions thereof will be omitted herein.

Figure 6:
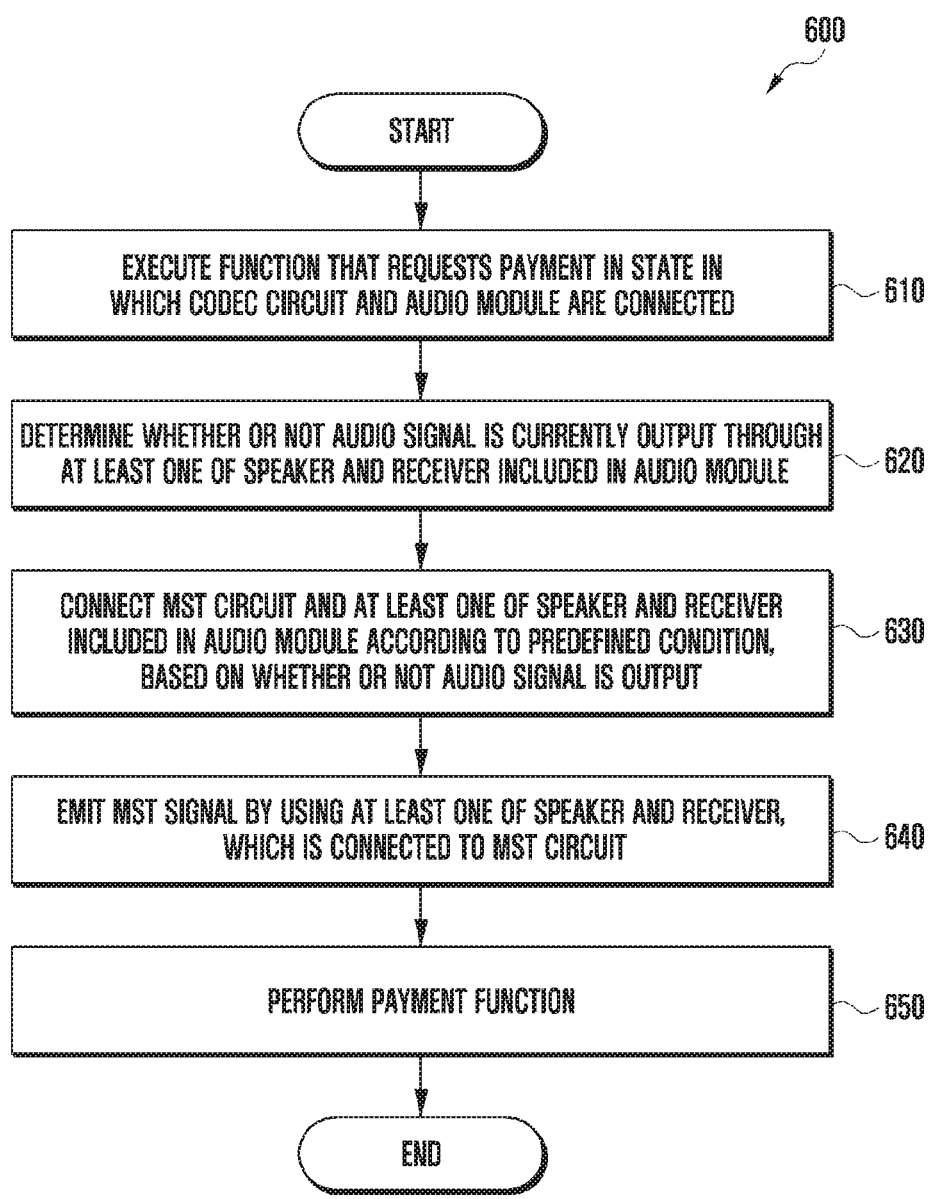
FIG. 6 is a flowchart for describing a method for making a payment by an electronic device according to various embodiments.

FIG. 6 is a flowchart 600 for describing a method for making a payment by an electronic device according to various embodiments.

Referring to FIG. 6, a processor (for example, processor 360 in FIG. 2) may perform a function that requests a payment in a state in which a codec circuit (for example, codec circuit 410 in FIG. 4) and an audio module (for example, audio module 440 in FIG. 4) are connected, in operation 610.

In an embodiment, if a function that requests a payment is received, the processor may determine whether or not an audio signal is currently output through at least one of a speaker and a receiver included in the audio module, in operation 620.

For example, whether or not the audio signal is currently output may include whether or not a telephone speech function is currently performed through a receiver (for example, receiver 443 in FIG. 4), whether or not an audio signal is currently output through a speaker (for example, speaker 441 in FIG. 4), and the like.

In an embodiment, based on whether or not an audio signal is output, the processor may control a switch unit (for example, switch unit 430 in FIG. 4) such that an MST circuit (for example, MST circuit 420 in FIG. 4) is connected to at least one of the speaker and the receiver included in the audio module according to a predefined condition, in operation 630.

In an embodiment, the predefined condition may include at least one of: whether or not the audio module, for example, the speaker is currently used; and/or whether or not the receiver is currently used; and a predetermined priority.

In an embodiment, the processor may emit an MST signal by using at least one of the speaker and the receiver, which is connected to the MST circuit, in operation 640, and may perform a payment function in operation 650.

In an embodiment, after the MST signal is transmitted, if a payment completion message is received, or if a signal that stops production of the MST signal is received, the processor may control the switch unit such that at least one of the speaker and the receiver, which is connected to the MST circuit, is connected to the codec circuit.

Above operation 610, operation 640, and operation 650 in FIG. 6 are identical to above-described operation 510, operation 530, and operation 540 in FIG. 5, and detailed descriptions thereof will be omitted herein.

In an embodiment, a method for making a payment by using an audio module of an electronic device may include the operations of: executing a function that requests a payment in a state in which a codec circuit and the audio module are connected; connecting an MST circuit and at least one of a speaker and a receiver included in the audio module, if the function that requests a payment is executed; and emitting an MST signal for a payment by using at least one of the speaker and the receiver, which is connected to the MST circuit.

In an embodiment, each of the speaker and the receiver may be configured to include a coil and a metal portion.

In an embodiment, the method for making a payment by using an audio module of an electronic device may include the operations of: producing the MST signal through the coil of at least one of the speaker and the receiver, which is connected to the MST circuit; and emitting the produced MST signal through the metal portion of at least one of the speaker and the receiver, which is connected to the MST circuit.

In an embodiment, the method for making a payment by using an audio module of an electronic device may include an operation of determining whether or not an audio signal is currently output through at least one of the speaker and the receiver if the function that requests a payment is executed. The operation of connecting at least one of the speaker and the receiver may include an operation of connecting the MST circuit to at least one of the speaker and the receiver included in the audio module according to a predefined condition, based on whether or not the audio signal is output.

In an embodiment, the method for making a payment by using an audio module of an electronic device may include an operation of connecting at least one of the speaker and the receiver, which is connected to the MST circuit, to the codec circuit if a payment completion message is received, or if a signal that stops production of the MST signal for a payment is received, after the MST signal for a payment is emitted.

Figure 7:
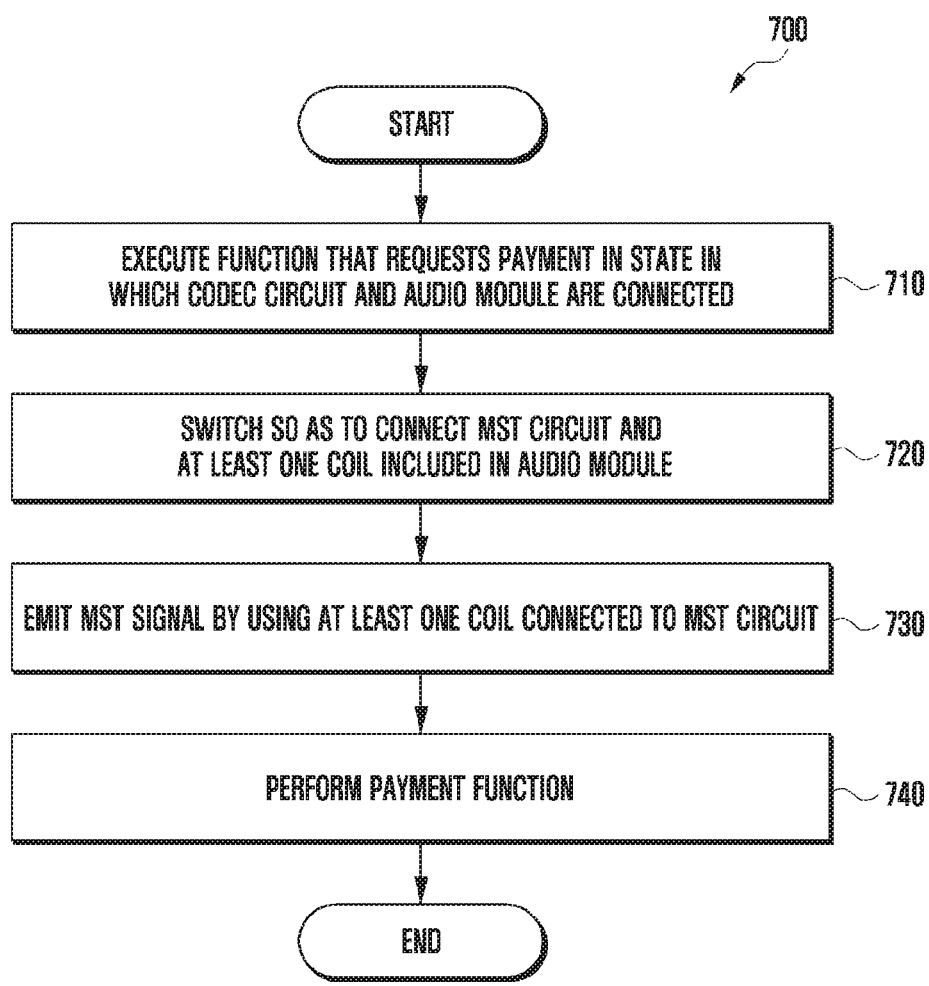
FIG. 7 is a flowchart for describing a method for making a payment by an electronic device according to various embodiments.

FIG. 7 is a flowchart 700 for describing a method for making a payment by an electronic device according to various embodiments.

Referring to FIG. 7, a processor (for example, processor 360 in FIG. 2) may perform a function that requests a payment in a state in which a codec circuit (for example, codec circuit 410 in FIG. 4) and an audio module (for example, audio module 440 in FIG. 4) are connected, in operation 710.

In an embodiment, if a function that requests a payment is received, the processor may control a switch unit (for example, switch unit 430 in FIG. 4) so as to connect an MST circuit (for example, MST circuit 420 in FIG. 4) and at least one coil included in the audio module, in operation 720.

In an embodiment, the audio module may include a speaker and a receiver, and each of the speaker and the receiver may include a coil (for example, coils 213 and 223 in FIG. 2). If a function that requests a payment is executed, the processor may control the switch unit so as to connect the MST circuit and the coil of at least one of the speaker and the receiver.

In an embodiment, the processor may emit an MST signal by using at least one coil connected to the MST circuit in operation 730, and may perform a payment function in operation 740.

Above operation 710 and operation 740 in FIG. 7 are identical to above-described operation 510 and operation 540 in FIG. 5, and repeated descriptions thereof will be omitted herein.

Figure 8B:
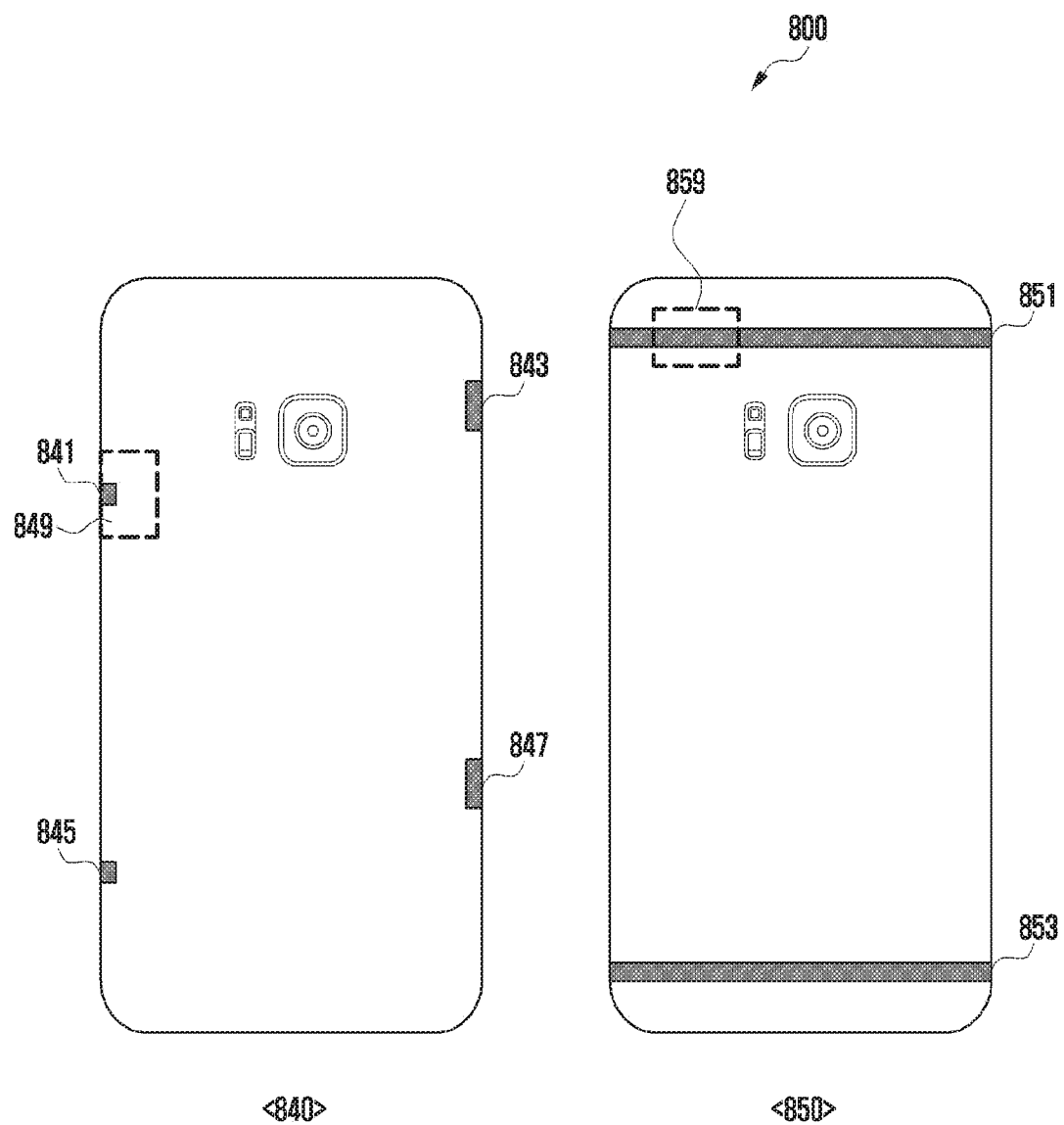

FIG. 8A and FIG. 8B are diagrams 800 illustrating at least one segmented portion and a speaker, disposed on the exterior of an electronic device, according to various embodiments.

Referring to FIG. 8A and FIG. 8B, at least one segmented portion may be disposed on a side surface of the electronic device (for example, electronic device 301 in FIG. 3) as illustrated at <820>, <830>, and <840>, or disposed on the rear surface of the electronic device as illustrated at <810> and <850>.

In an embodiment, the electronic device may include at least one segmented portion. For example, if the exterior of the electronic device is made of a conductive member (for example, metal), the at least one segmented portion included may prevent degradation of the quality of an MST signal caused by interference occurring when the MST signal is transmitted.

In an embodiment, a speaker (for example, speaker 441 in FIG. 4) may be disposed to at least partially overlap the at least one segmented portion of the electronic device. For example, if the speaker is connected to an MST circuit (for example, MST circuit 420 in FIG. 4), among a receiver (for example, receiver 443 in FIG. 4) and the speaker, in response to execution of a function that requests a payment, an MST signal may be radiated through the segmented portion disposed to overlap the speaker, thereby preventing degradation of the quality of the MST signal.

In an embodiment, one or more segmented portions 811 and 813 may be disposed in the shape of two curved lines having upward/downward symmetry as illustrated at <810>, and at least a part of the speaker 815 may be disposed to at least partially overlap one (for example, segmented portion 811) of the one or more segmented portions 811 and 813.

In an embodiment, one or more segmented portions 821, 823, 825, and 827 may be disposed to have upward/downward symmetry as illustrated at <820>, and at least a part of the speaker 829 may be disposed to overlap one (for example, segmented portion 821) of the one or more segmented portions 821, 823, 825, and 827.

In an embodiment, one or more segmented portions 831, 833, 835, and 837 may be disposed to have leftward/rightward symmetry as illustrated at <830>, and at least a part of the speaker 839 may be disposed to overlap one (for example, segmented portion 831) of the one or more segmented portions 831, 833, 835, and 837.

In an embodiment, one or more segmented portions 841, 843, 845, and 847 may be disposed to have leftward/rightward asymmetry as illustrated at <840>, and at least a part of the speaker 849 may be disposed to overlap one (for example, segmented portion 841) of the one or more segmented portions 841, 843, 845, and 847.

In an embodiment, one or more segmented portions 851 and 853 may be disposed in the shape of two straight lines having upward/downward symmetry as illustrated at <850>, and at least a part of the speaker 859 may be disposed to at least partially overlap one (for example, segmented portion 851) of the one or more segmented portions 851 and 853.

In an embodiment, the number and/or position of segmented portions disposed on the electronic device may not be configured to the above-described configurations, and may be configured in various types.

Figure 9:
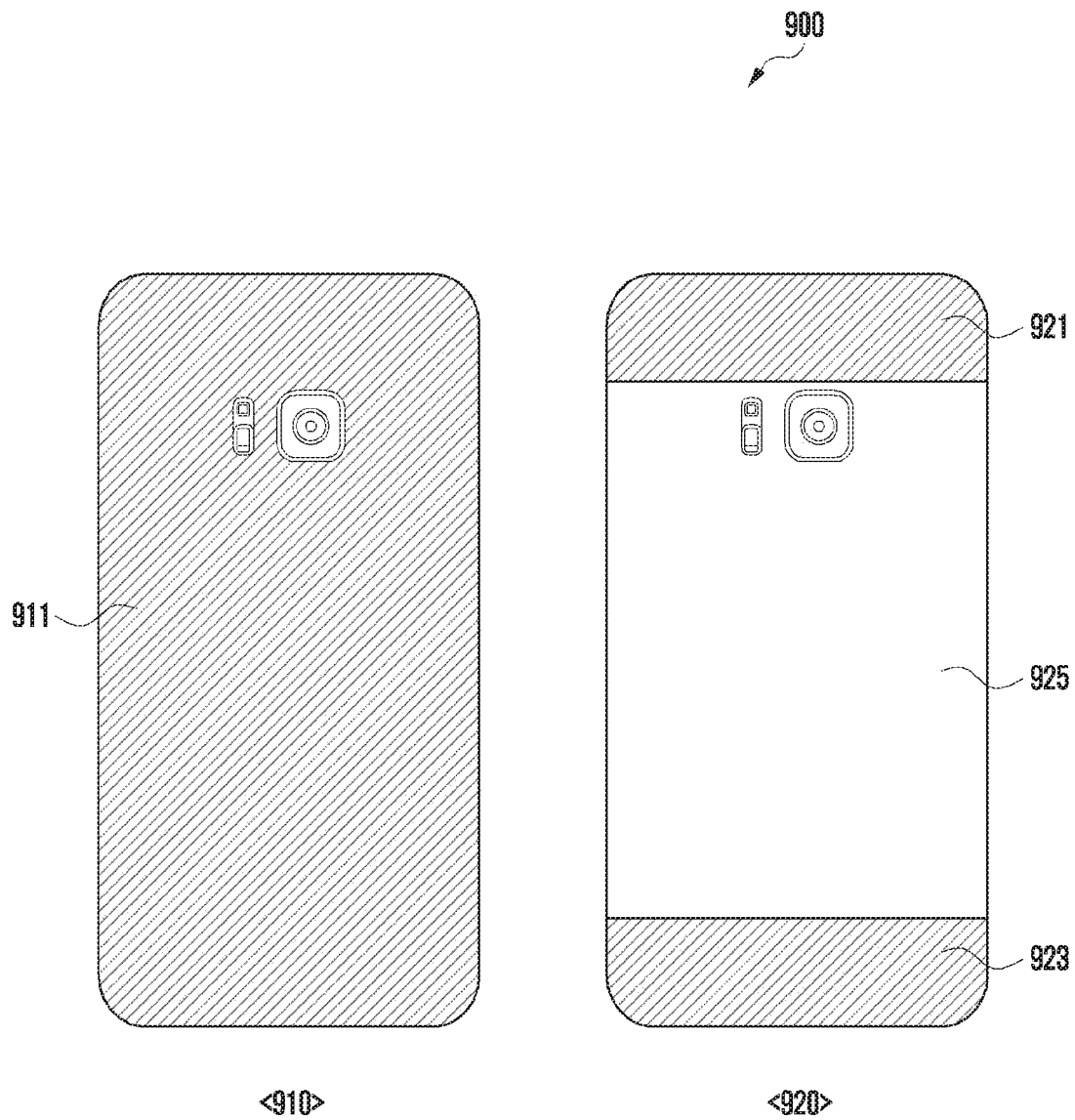
FIG. 9 is a diagram illustrating the exterior of an electronic device according to various embodiments.

FIG. 9 is a diagram 900 illustrating the exterior of an electronic device according to various embodiments.

Referring to FIG. 9, the exterior of the electronic device (for example, electronic device 301 in FIG. 3) may be made of a nonconductive member 911 (for example, nonmetal) as illustrated at <910>.

In an embodiment, if the exterior of the electronic device is made of a nonconductive member 911, a receiver (for example, receiver 443 in FIG. 4) and a speaker (for example, speaker 441 in FIG. 4) may be disposed in at least a partial area of the exterior made of the nonconductive member 911.

For example, the exterior of the electronic device may be injection-molded (for plastic injection-molded) so as not to disturb or interfere with radiation of magnetic field signals, and the receiver and the speaker may be disposed in at least a partial area of the injection-molded exterior of the electronic device.

In an embodiment, the exterior of the electronic device may include a conductive part 925 and nonconductive parts 921 and 923 as illustrated at <920>.

In an embodiment, if the exterior of the electronic device includes a conductive part 925 and nonconductive parts 921 and 923, the receiver and the speaker may be disposed in at least a partial area of the nonconductive parts 921 and 923.

In an embodiment, the receiver and the speaker, disposed in at least a partial area of the nonconductive parts 911, 921, and 923 of the electronic device, may prevent degradation of an MST signal caused by interference occurring when the MST signal is transmitted through the receiver and the speaker.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor(e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
a housing including a conductive member and at least one segmented portion formed in at least a portion of the housing;
an audio module comprising a speaker and a receiver, wherein the speaker and the receiver are disposed to at least partially overlap the at least one segmented portion, and wherein each of the speaker and the receiver comprises a coil and a metal portion;
a codec circuit configured to transmit/receive an audio signal; a magnetic secure transmission (MST) circuit;
a switch unit; a display;
a memory; and
a processor electrically connected to the audio module, the codec circuit, the MST circuit, the switch unit, the display, and the memory, wherein the processor is configured to:
control the switch unit to connect the MST circuit to at least one of the speaker and the receiver included in the audio module if the electronic device executes a function requesting a payment while the codec circuit and the audio module are connected to each other, control at least one of the speaker or the receiver to emit an MST signal for the payment by producing the MST signal through the coil of at least one of the speaker and the receiver, which is connected to the MST circuit and emitting the produced MST signal through the metal portion, when the speaker receives a request for outputting the audio signal: control the switch unit to connect the MST circuit to the receiver, control the receiver to emit the MST signal for the payment, and when the payment is completed, control the switch unit to connect the codec circuit to the receiver, and when the receiver receives the request for outputting the audio signal: control the switch unit to connect the MST circuit to the speaker, control the speaker to emit the MST signal for the payment, when an event requesting to output the audio signal using the speaker is received while emitting the MST signal through the speaker, display a notification related to the event on the display instead of outputting the notification related to the event through the speaker, when the payment is completed, control the switch unit to connect the codec circuit to the speaker.

2. The electronic device of claim 1, wherein the processor is configured to control the switch unit to connect the MST circuit to the speaker or the receiver based on a predefined priority, when the speaker and the receiver do not output the audio signal.

3. The electronic device of claim 1, wherein the processor is configured to control the switch unit to connect the codec circuit to at least one of the speaker and the receiver, which is connected to the MST circuit, if a signal that stops production of the MST signal is received after the MST signal for the payment is emitted.

4. The electronic device of claim 3, wherein the signal that stops production of the MST signal comprises at least one of a signal that senses that a predetermined time passes after the MST signal for the payment is emitted, a signal that senses that the electronic device is in motion, and a user input for ending the payment function.

5. The electronic device of claim 1, wherein, if the electronic device has an exterior injection-molded or made of a nonconductive member, the speaker and the receiver are disposed in at least a part of an area injection-molded or made of the nonconductive member, or if the exterior of the electronic device comprises a conductive part and a nonconductive part, the speaker and the receiver are disposed in at least a part of the nonconductive part.

6. A method for making a payment by using an audio module of an electronic device, the method comprising:
   executing a function requesting a payment while a codec circuit and the audio module are connected to each other;
   connecting an MST circuit and at least one of a speaker and a receiver included in the audio module, wherein each of the speaker and the receiver comprises a coil and a metal portion;
   controlling at least one of the speaker or the receiver to emit an MST signal for the payment;
   when the speaker receives a request for outputting the audio signal: connecting the MST circuit to the receiver,
   controlling the receiver to emit the MST signal for the payment, and when the payment is completed, connecting the codec circuit to the receiver;
   and when the receiver receives the request for outputting the audio signal:
   connecting the MST circuit to the speaker, controlling the speaker to emit the MST signal for the payment, when an event requesting to output the audio signal using the speaker is received while emitting the MST signal through the speaker, displaying a notification related to the event on a display instead of outputting the notification related to the event through the speaker, and when the payment is completed, connecting the codec circuit to the speaker, wherein a housing of the electronic device includes a conductive member and at least one segmented portion formed in at least a portion of the housing, wherein the speaker and the receiver are disposed to at least partially overlap the at least one segmented portion, and wherein the emitting the MST signal for the payment comprises:
   producing the MST signal through the coil of at least one of the speaker and the receiver, which is connected to the MST circuit; and
   emitting the produced MST signal through the metal portion of at least one of the speaker and the receiver, which is connected to the MST circuit.

7. The method of claim 6, further comprising connecting the MST circuit to the speaker or the receiver based on a predefined priority when the speaker and the receiver do not output the audio signal.

8. The method of claim 6, further comprising connecting the codec circuit to at least one of the speaker and the receiver, which is connected to the MST circuit, if a signal that stops production of the MST signal for the payment is received, after the MST signal for the payment is emitted.

* * * * *